Oct. 29, 1940.  W. C. HOCH  2,219,314
VIEW FINDER SYSTEM
Filed May 18, 1937  9 Sheets-Sheet 1
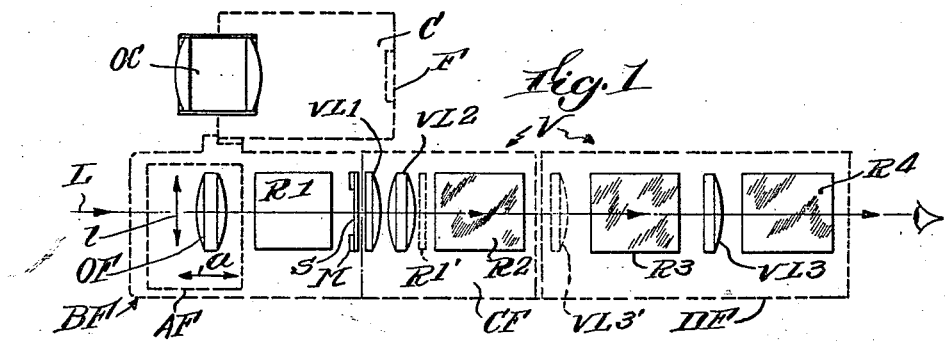
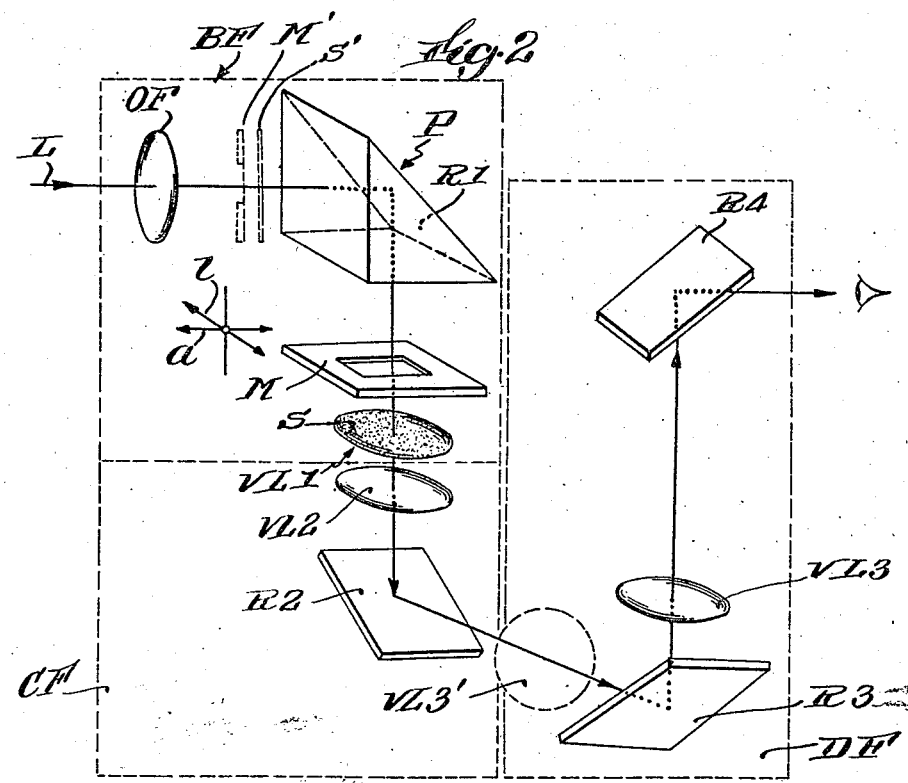
Inventor:
Winton C. Hoch
by Roberts, Cushman & Woodbury
Attys.

Oct. 29, 1940.   W. C. HOCH   2,219,314
VIEW FINDER SYSTEM
Filed May 18, 1937   9 Sheets-Sheet 2
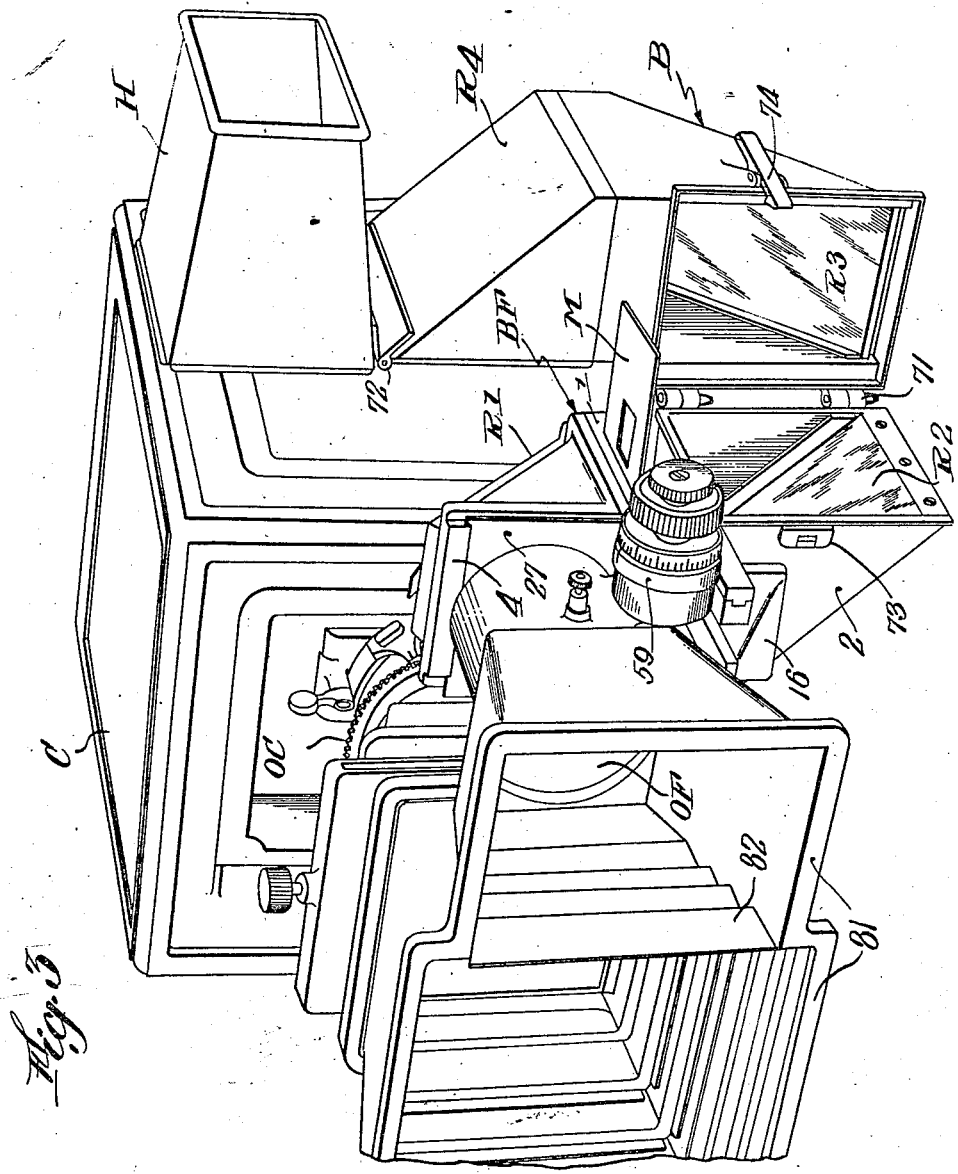

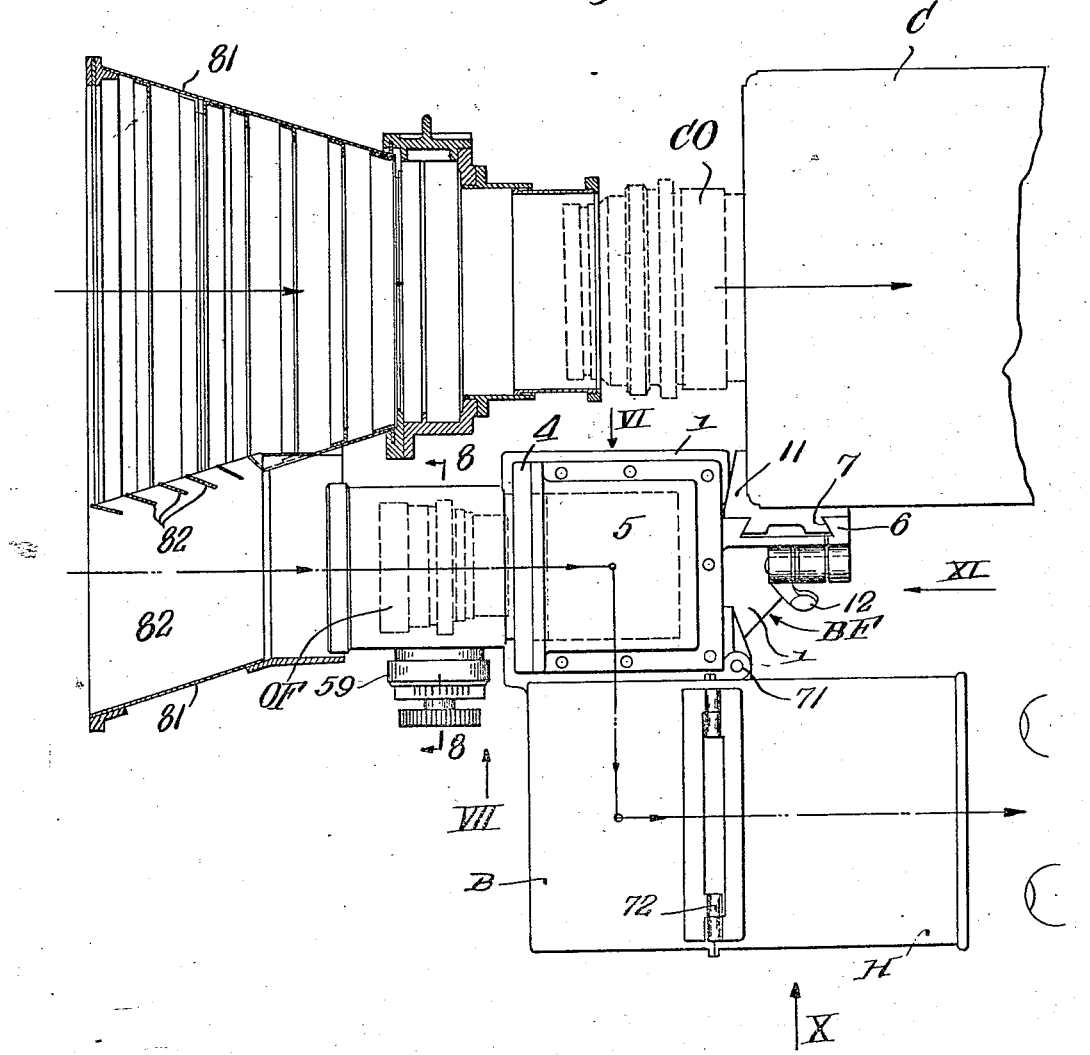

Oct. 29, 1940.   W. C. HOCH   2,219,314
VIEW FINDER SYSTEM
Filed May 18, 1937   9 Sheets-Sheet 4
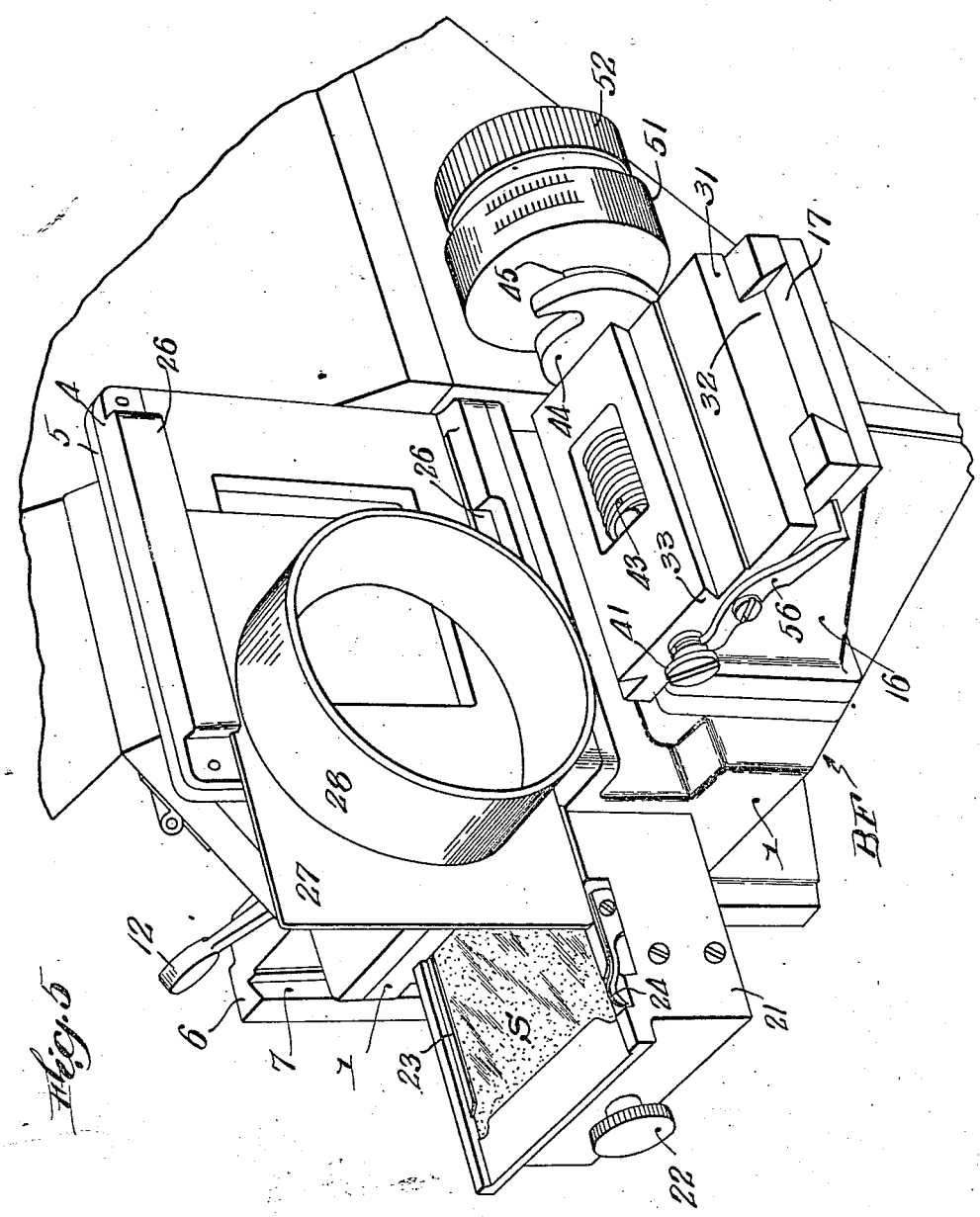

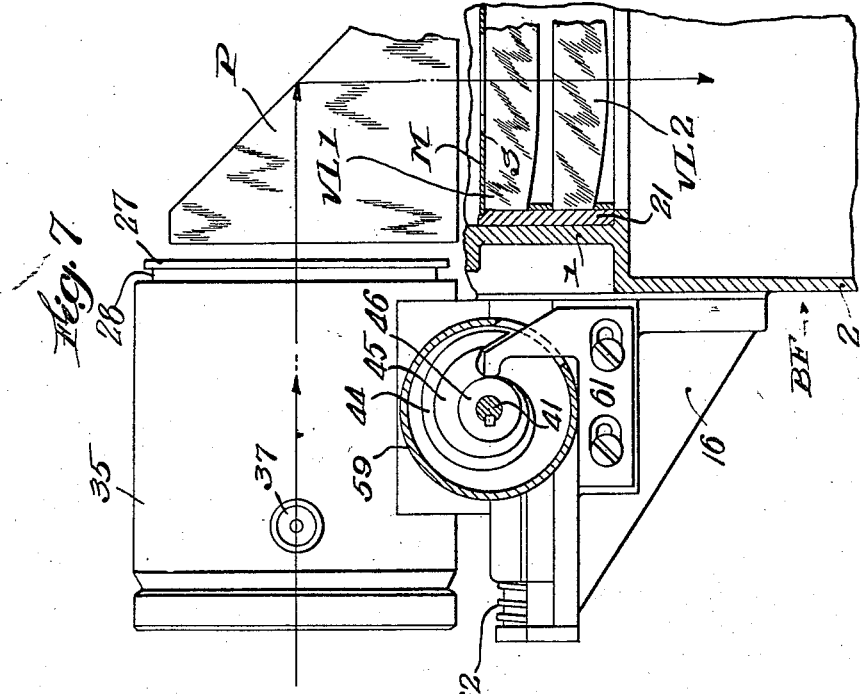
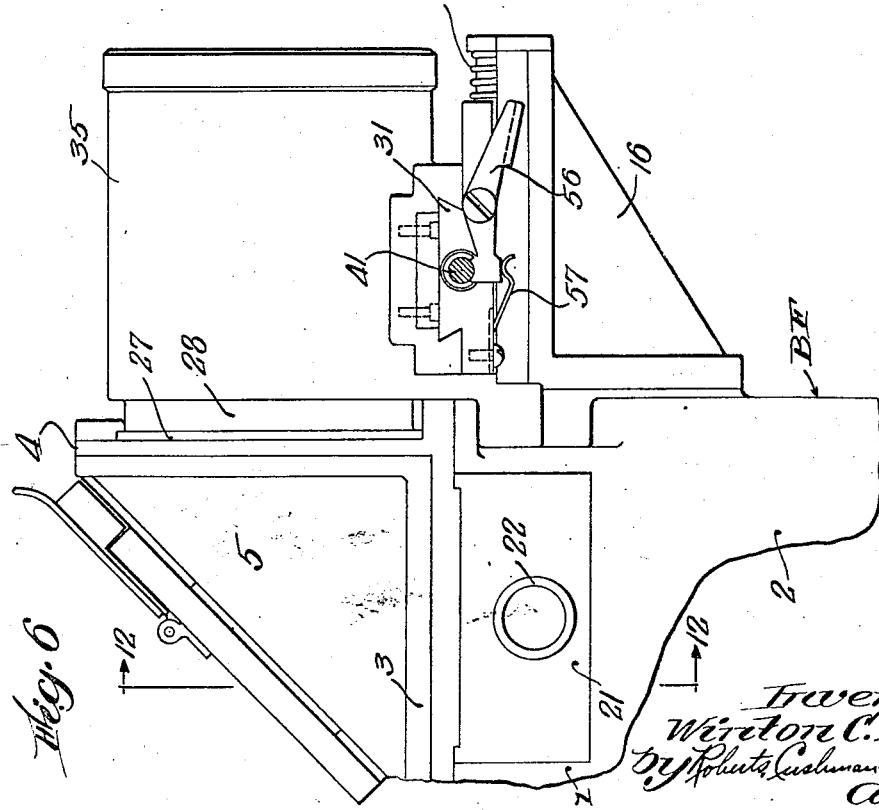

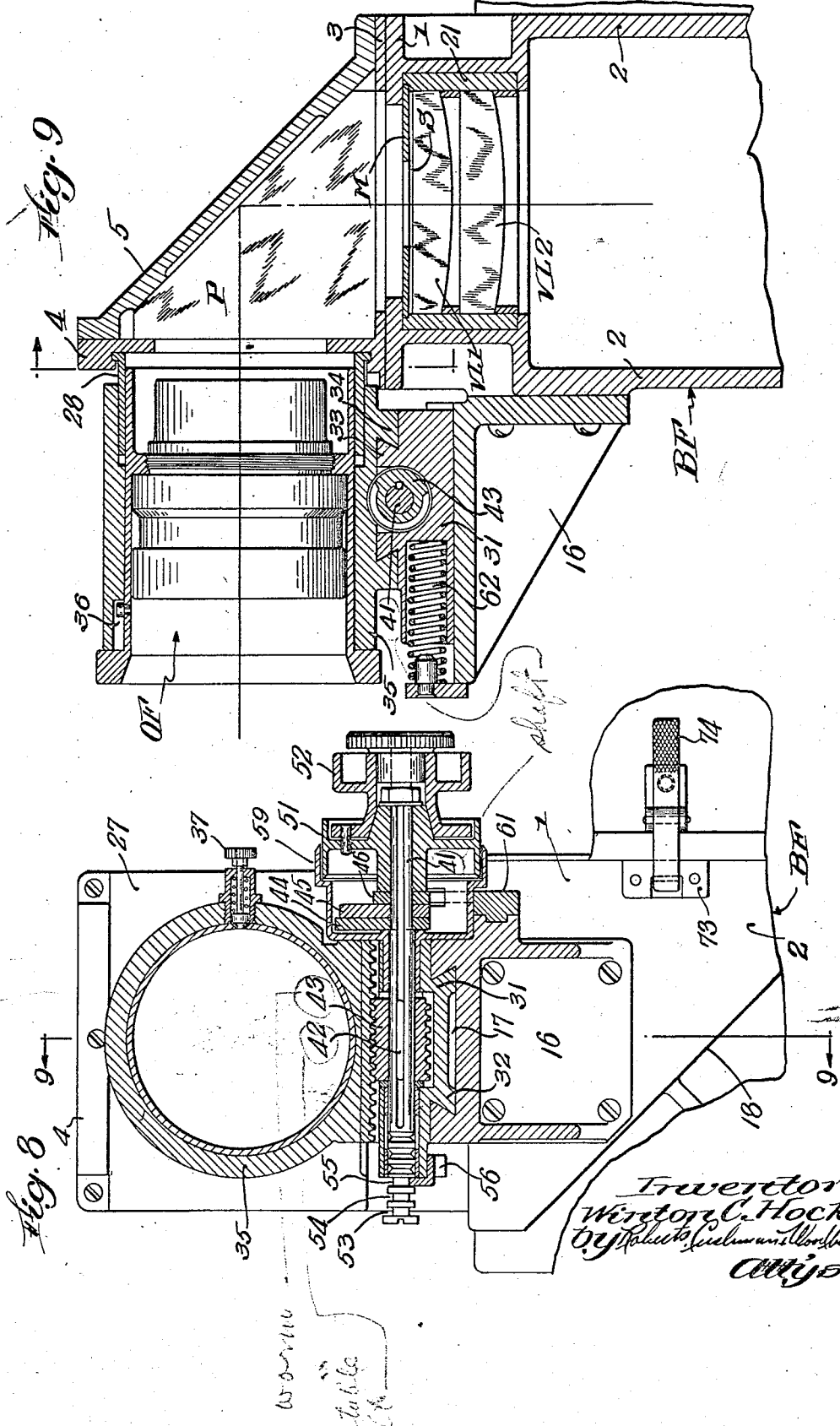

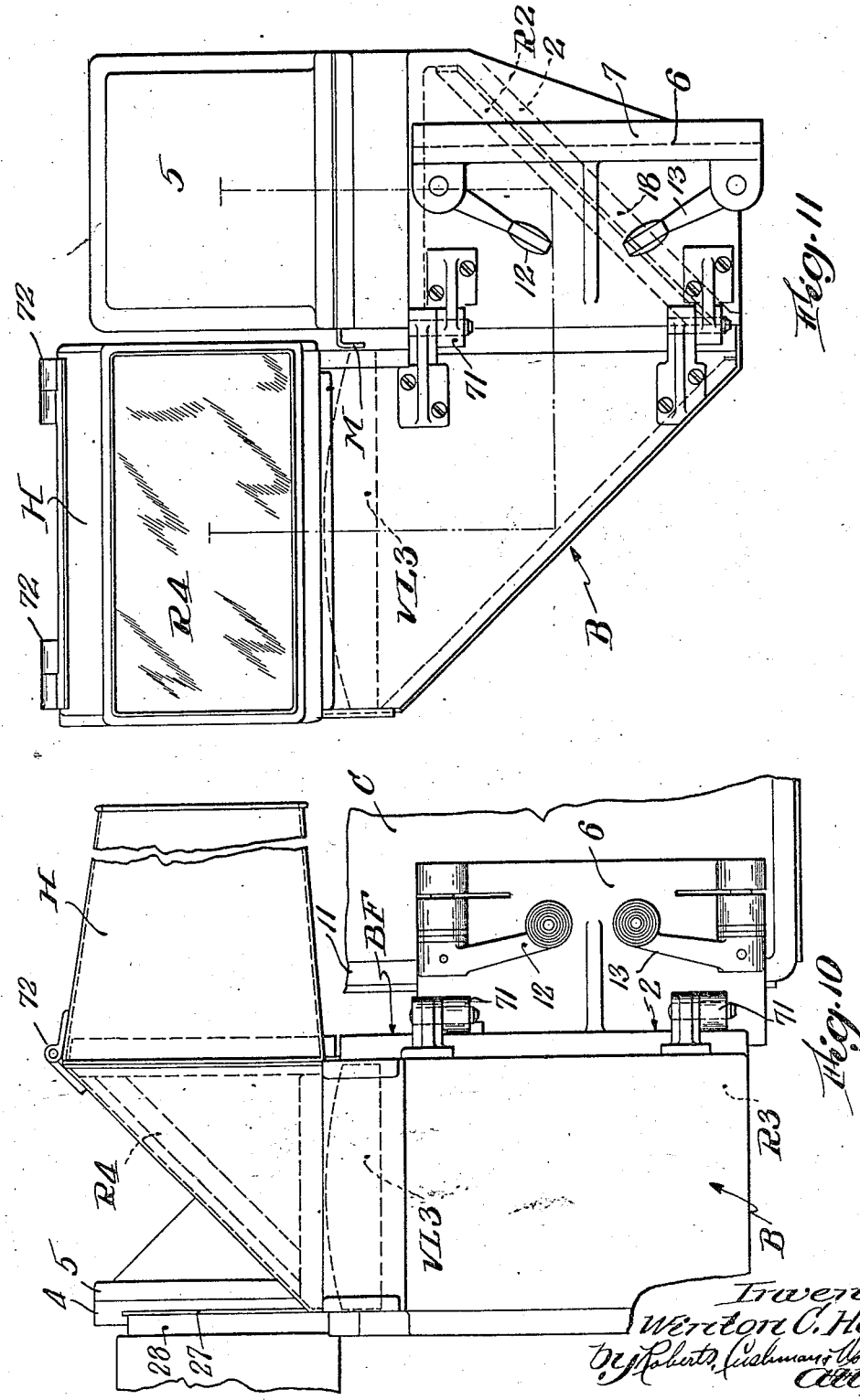

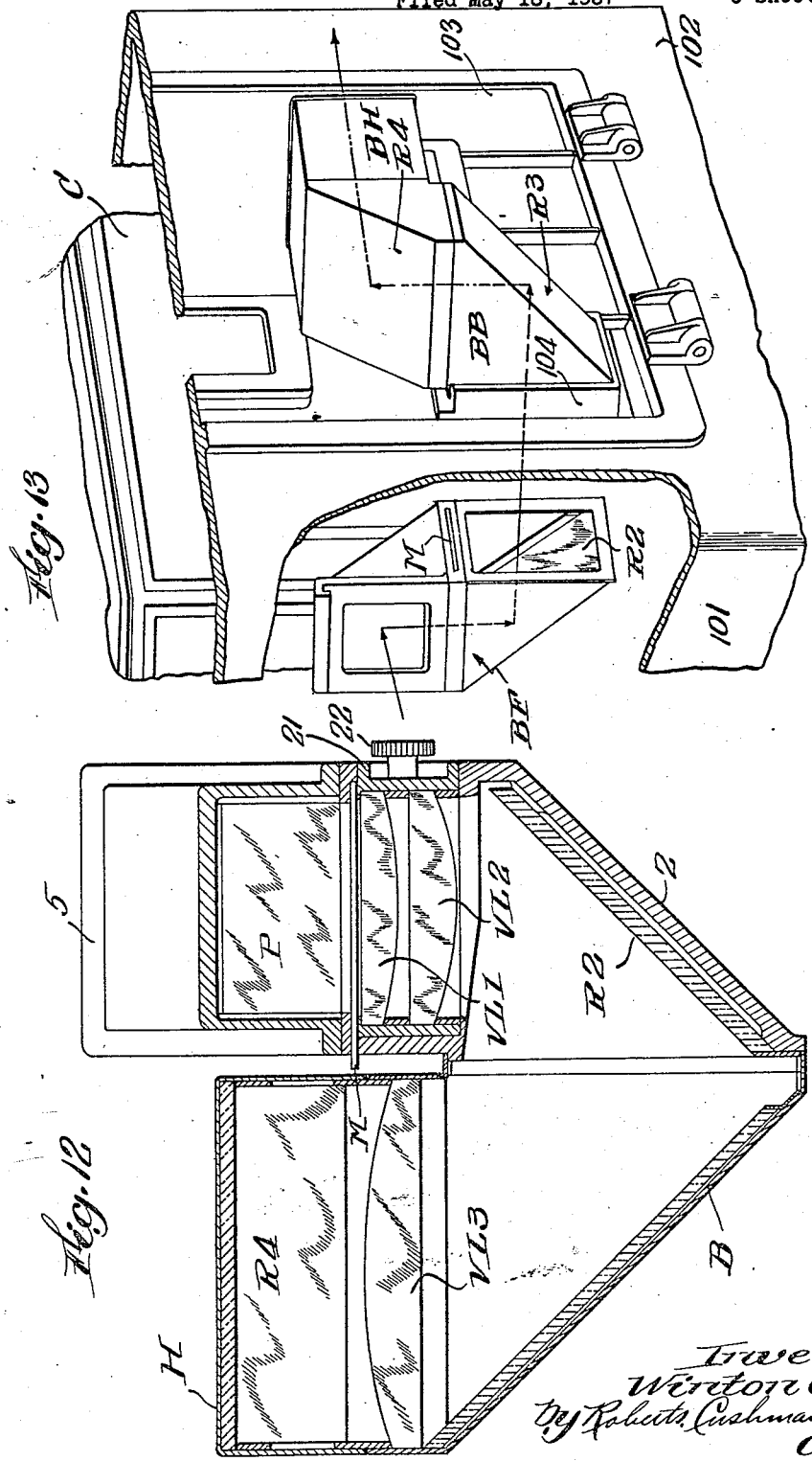

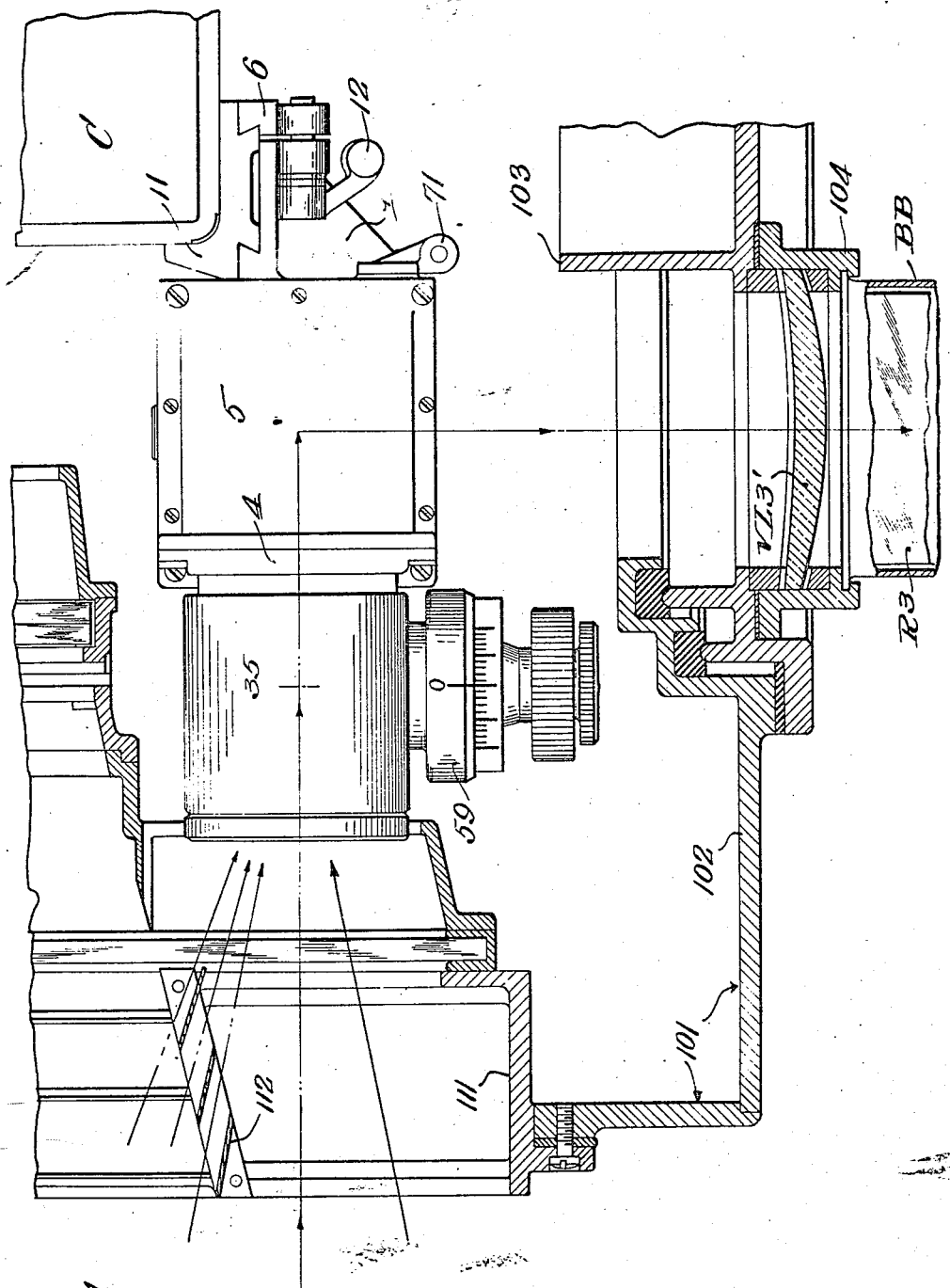

Patented Oct. 29, 1940

2,219,314

UNITED STATES PATENT OFFICE 2,219,314

VIEW FINDER SYSTEM

Winton C. Hoch, Los Angeles, Calif., assignor to Technicolor Motion Picture Corporation, Boston, Mass., a corporation of Maine Application May 18, 1937, Serial No. 143,308

14 Claims. (Cl. 95—44)

This invention relates to optical apparatus, more particularly to view finding equipment used with photographic cameras.

It is an object of the present invention to provide improved view finders of the type producing an erect image and having instrumentalities for focusing, for compensating parallax between camera and finder objectives, and for framing the finder image in convenient and accurate manner.

In one aspect of the invention, provisions are made for convenient adaptation of the finder for use with various camera objectives of different focal lengths. Another feature of my invention is the accurate and convenient simultaneous adjustment to varying object distances of the parallax compensation or focus settings, or both, of the finder, with provisions to adapt these settings and the corresponding framing of the finder image to different camera objectives by avoiding the undesirable so-called "key stoning" effect inherent in commonly used finder equipment.

A further feature of the invention is the use of image erecting reflectors in such a manner that the finder objective can be arranged very closely to the camera objective, whereas the image can be conveniently viewed at considerable distance from the camera axis.

The optical elements of a view finder of the present type comprise a group of members whose correlation to one another and to the camera lens is critical, whereas other elements must not necessarily be positioned with the same degree of exactness. Accordingly, the invention provides, in another aspect thereof, for especially rigid and accurate correlation of the elements of the first group, unchanged for modified camera set ups. The second group of elements is mounted in a manner permitting adaptation to various uses; they are easily removable and accessible, and exchangeable for elements of similar optical function but adapted for different camera setups, for example for use with cameras not having any special protective enclosure and being commonly referred to as "wild camera," or, on the other hand, for use with cameras which are equipped with a special soundproof enclosure called "blimp." If used in the last mentioned manner, my finder may be arranged in such a manner that any mechanical sound wave transmitting connection between camera and blimp, by way of the finder structure, is avoided. This feature of my invention also permits the camera to be freely shifted within its blimp. Also, a viewing lens can be used as a window for the blimp, thereby simplifying and improving the optical and mechanical construction of such apparatus.

Still another feature of my invention consists in provisions for simultaneously adjusting focal plane and parallax compensation, correctly for any given object distance, by adapting this adjustment in convenient and accurate manner to different camera objectives, the view finder image being always framed in exact correspondence with the image on the film in the camera.

The above and other aspects and objects of the invention will be apparent from the following detailed explanation of the genus of the invention with reference to several concrete embodiments thereof. The description refers to drawings in which:

Fig. 1 is a diagrammatic representation of the optical elements incorporated in a practical embodiment of the invention;

Fig. 2 is a representation similar to Fig. 1, but indicating the spatial arrangement of the elements;

Fig. 3 is a perspective view of a motion picture camera arrangement according to the invention;

Fig. 4 is a plan view of the camera shown in Fig. 3, with the camera lens hood in horizontal setcion;

Fig. 5 is an isometric view of an embodiment of the finder objective movement and the matte arrangement according to the invention;

Fig. 6 is a side elevation seen in direction VI indicated in Fig. 4;

Fig. 7 is a side elevation, partly in vertical section, seen in direction VII indicated in Fig. 4;

Fig. 8 is a section on line 8—8 of Fig. 4;

Fig. 9 is a section on line 9—9 of Fig. 8;

Fig. 10 is a side elevation seen in direction X indicated in Fig. 4;

Fig. 11 is a side elevation seen in direction XI indicated in Fig. 4;

Fig. 12 is a section on line 12—12 of Fig. 6;

Fig. 13 is an isometric view of an embodiment of the invention as applied to a camera having a blimp; and Fig. 14 is a plan view, partly in horizontal section, corresponding to Fig. 4, but showing the embodiment according to Fig. 13.

Referring now especially to Figs. 1, 2, 3 and 13, the general arrangement of apparatus according to my invention will first be described. In these figures, C represents a camera housing in which a film F is exposed to light from camera objective OC. The view finder V has a view finder base or frame BF, rigidly fastene dto the camera housing by means to be described in detail later on. A view finder objective OF is mounted on a finder objective support AF permitting axial and lateral sliding movement relatively to camera and view finder base, as indicated by arrows $a$ and $l$ in Figs. 1 and 2. Likewise mounted on base BF are a reflector R1, a translucent screen S, for example a ground glass surface, and a frame or matte M, defining a given portion of the image of an object field, corresponding to the image object field portion reproduced on the film or films arranged in the camera for photographic exposure.

Adjustment of view finder lens OF in direction $a$ is used for focusing an image, produced by that lens and framed by matte M, sharply on screen S, in well known manner. Due to the distance between the optical axes of lenses OC and OF,—although this distance is in the present instance reduced as far as possible,—a parallax between the images as framed in camera and view finder, respectively, would be introduced, if lens OF were exactly centered with respect to matte M. This discrepancy differs for different object distances and focal lengths of camera and view finder lenses, and, according to my invention, is compensated by moving lens OF and matte M relatively to each other, in the embodiment shown by moving lens OF in direction $l$ perpendicular to its optical axis, this adjustment being positively correlated with the object distance or location of the focal plane and the particular lens systems used. Conventional parallax adjustment devices provide for rotation of the view finder about an axis, in order to direct it towards a point upon which the camera lens is focused; this adjustment introduces dimensional changes unequal at the respective sides of the finder and therefore commonly referred to as "key stoning." It will be evident that my arrangement is free of any such distortional effect.

Objective OF, matte M, screen S and, in the above described embodiment also reflector R1, determine the relation of camera and finder images and must be exactly correlated to the camera lens and to each other. Therefore, according to my invention, they are joined to form a basic finder unit mounted on base BF which is again firmly fastened to the camera, thereby insuring maximum rigidity and accuracy. The other elements have the purpose of erecting and enlarging the image on screen S, at the same time permitting convenient observation thereof. The correlation of these elements is not as critical as that of the first mentioned group, and they may be mounted with less concern about their location relatively to the camera lens. In Figs. 1 and 2, these elements are indicated as mounted in groups CF and DF. They comprise magnifying viewing lenses VL1, VL2 and VL3, and reflectors R1, R2, R3 and R4. As mentioned above, reflector R1 is in the preferred embodiment herein described arranged between lens objective and image screen, but it could also be mounted behind the screen, as indicated at R1' of Fig. 1. In that case, S and M would be located in the undeviated light beam shown horizontally in Fig. 2, as indicated as S' and M' of that figure.

The screen S may be applied directly to lens VL1, by suitably treating the flat front surface of that lens, as indicated in Fig. 2, and to be described more in detail hereinafter.

In the embodiments herein shown, lens VL1, screen S integral with VL1, lens VL2 and reflector R2, form a group CF mounted with objective OF and reflector R1 on finder base BF, as shown in Figs. 3 and 13.

In the modification according to Fig. 3, the camera is used "wild," that is without protective blimp. In this instance, reflectors R3 and R4, with lens VL3 therebetween, are mounted on box B hinged to base BF, forming the unit DF indicated in Figs. 1 and 2.

In the modification according to Fig. 13, unit DF is mounted on the blimp independently of the camera, lens VL3 in this instance being arranged in front of lens reflector R, as shown at VL3' of Fig. 2, and constituting a closure and window for the blimp aperture admitting the light beam which carries the view finder image, as will later be described in detail.

It will be apparent from the preceding description that my new view finder arrangement provides in simple and accurate manner, without using any parts not absolutely necessary, for focus and parallax adjustment; that it brings the view finder objective as close to the camera lens as mechanically possible, at the same time conducting, by means of the image erecting reflectors, the image bearing beam into a position where it can be conveniently observed; that it provides for maximum rigidity and accuracy as far as necessary; and that, on the other hand, it is very flexible and adaptable to different uses of the camera without necessitating disturbance of accuracy by avoiding removal and re-assembly of the optically critical elements of the finder.

For a more detailed description,—first of a "wild" camera incorporating my invention,—reference is now made especially to Figs. 3 to 12.

As shown in these figures, view finder base BF consists of a cast frame or box 1 from which extends downwardly a mirror support (Figs. 8 and 9) having an inclined wall 18 upon which reflector R2 is mounted (Figs. 3, 11). Screwed to the top of box 1 is a prism support 3 having an upwardly extending frame 4. A prism cover 5 is secured to support 3, positioning prism P which, in the present embodiment, supplies reflecting surface R1. Integral with box 1 is a mounting flange 6 having split dovetails 7 (Figs. 4, 5, 10, 11) adapted to engage a correspondingly shaped flange 11 of camera C. By means of screws 12, 13, the dovetails can be rigidly clamped together.

A bracket 16 is screwed to the front face of mirror extension 2 of box 1 (Figs. 6, 7, 8, 9), the top face of bracket 16 being provided with a dovetailed groove 17 (Fig. 8).

A lens support frame or drawer 21 slides within recess or box 1 (Figs. 5, 6, 7, 9, 12); lenses VL1 and VL2 are mounted in this frame which can be removed from box 1 by means of knob 22. The flat upper surface of lens VL1 forms the previously described screen S above which matte M slides in suitable guides 23, 24. Guides 24 may be formed by springs pressing the matte sheet against lip 23 on the opposite side, thus firmly yet removably holding the matte slide within frame 21.

Frame 4 (Figs. 3, 5, 9) has grooves 26 guiding a shield 27 having a circular opening surrounded by sleeve 28. Shield 27 extends far enough beyond either side of frame 4 to exclude light from the window of the latter if it slides to the right or left.

Dovetail groove 17 of bracket 16 (Figs. 5, 8, 9) supports a correspondingly machined intermediate slide 31 which has at its top a dovetail 33 of conveying connection between the basic finder unit on the camera and the viewing elements on the blimp; this arrangement is acoustically satisfactory and also does not require any change of the optically critical finder elements if the blimp is added to the "wild" camera.

In this instance, lens hood or matte box 111 with louvers 112 is mounted on the blimp, as shown in Fig. 14.

In operating my view finder, either with a "wild" camera, or with a camera having a blimp, the finder lens corresponding to the camera lens in use is selected and inserted in master mount 35, as above described. By means of knob 52, and latch 56, the cam and scale corresponding to that lens are selected. Box B with hood H having been attached to hinges 71, and the matte M corresponding to the particular camera lens having been inserted, the finder image can now be focussed by turning knob 52, whereby the proper parallax compensation will be automatically applied, as above described. The object distance can be read on the scale on drum 51.

If it is desired to use a blimp, box B is detached the unit BB instead inserted into door 103 of blimp 101. Otherwise, the operation is exactly as above described. In order to avoid opening of the blimp door, a non-sound transmitting extension of the finder setting device, operable from the outside of the blimp, may be provided.

It should be understood that the present disclosure is for the purpose of illustration only and that this invention includes all modifications and equivalents which fall within the scope of the appended claims.

I claim:

1. Photographic apparatus of the character described comprising, in combination with a camera housing and a camera objective mounted on said housing, a view finder base rigidly fastened to said housing, means for holding a view finder objective and mounted on said base for movement in the direction of the axis of an objective therein, and substantially perpendicular thereto, means fixed to said base for framing a view finder image, finder control means for simultaneously moving said holding means in said two directions by amounts at which said perpendicular movement compensates changes in parallax between said objectives upon objective focusing movements parallel to said axis, and means for changing the ratio of said movements in order to provide correct parallax compensation for different view finder objectives.

2. Photographic apparatus of the character described comprising, in combination with a camera housing and a camera lens mounted on said housing, a view finder base fastened to said housing, an image receiving surface mounted on said base, a view finder objective mounted on said base with its axis substantially parallel to said surface for two dimensional adjustment relatively to said surface within a plane substantially parallel to that surface, means for deflecting light from said objective towards said surface, and means for simultaneously moving said objective along and perpendicular to its axis at a ratio compensating the parallax change upon focusing movements along said axis by a movement normal thereto.

3. Photographic apparatus of the character described comprising, in combination with a camera housing and a camera lens mounted on said housing, a view finder base fastened to said housing, an image receiving matte frame fixed to said base, a master mount adapted to receive a view finder objective arranged on said base for two dimensional adjustment relatively to said matte within a plane substantially parallel to the axis of said objective, means for moving said master mount in the direction of said axis and simultaneously perpendicular thereto at a ratio compensating the parallax change upon focusing movement of the objective in the direction of said axis by a movement normal thereto, means for changing said ratio in conformity with different focal distances of objectives in said master mount, and means for selectively indicating the focusing position of said objectives for different adjustment paths of said master mount corresponding to different ones of said ratios.

4. A view finder of the character described comprising a base, slidingly mounted on said base a lens mount sleeve, a support plate slidingly mounted on said base for movement substantially parallel to the axis of said sleeve, a master lens mount slidingly mounted on said plate for movement substantially normal to said axis and engaging said sleeve, journaled on said plate a shaft extending substantially normal to said axis, having a worm drive for moving said master mount and having a cam contacting a stop on said base, and means for rotating said shaft whereby said worm moves said mount and said sleeve normally to said axis and said cam moves said plate with said master mount parallel to said axis.

5. A view finder of the character described comprising a base, slidingly mounted on said base a lens mount sleeve, a support plate slidingly mounted on said base for movement substantially parallel to the axis of said sleeve, a master lens mount slidingly mounted on said base for movement substantially normal to said axis and engaging said sleeve, mounted on said plate a shaft extending substantially normal to said axis, having a worm engaging a rack on said master mount and having two cams, a stop on said base, means for selectively associating either one of said cams with said stop, and means for rotating said shaft whereby said worm moves said mount and said sleeve normally to said axis and said selected cam moves said plate with said master mount parallel to said axis.

6. In combination with view finder apparatus of the character described, support means having a frame for passing an image bearing view finder beam, slidably mounted over said frame a shield sufficiently large to cover said frame over a certain range of sliding movement thereof, a sleeve extending from an opening in said shield, and a lens mount movably mounted on said support for adjustment in the direction of said sliding movement of said shield and in the direction substantially perpendicular thereto, and engaging said sleeve, said shield and said sleeve affording a light seal between said frame and said lens mount moving laterally and axially relatively to each other.

7. Photographic apparatus of the character described comprising, in combination with a camera housing and a camera objective mounted on said housing, a view finder base fastened to said housing, a view finder objective mounted on said base adjacent to said camera objective with its rear face outside of said housing, viewing aperture means laterally of said housing, and reflecting surfaces outside of said housing and including surfaces in a lateral axis intermediate said finder objective and said aperture means, said surfaces being spaced and relatively inclined for erecting an image formed by said finder objective and for similar shape but at right angles to lower dovetail 32. With dovetails 34, a master mount tube 35 moves laterally upon dovetails 33 of slide 31. Sleeve 28 extends into the interior of mount 35 and it will be evident that shield 27 following the lateral movement of mount 35 and sleeve 28, and the overlapping portions of mount and sleeve, form a light seal between the compartment containing prism P and the lens mount 35. View finder objectives VO can be inserted into mount 35, secured against rotation by groove and key arrangement 36 (Fig. 9) and catch 37 (Fig. 8).

A shaft 41 (Figs. 5, 8, 9) is journaled in slide 31, at right angles to the optical axis of the objectives. By means of key and keyway arrangement 42 (Fig. 8), shaft 41 slides within worm 43 which is secured against axial movement by suitable shoulders of slide 31. Fixed to shaft 41 are two cams 44, 45 and a collar 46 (Figs. 7, 8). Likewise fastened to shaft 41 are a scale drum 51 and knobs 52. At the other end, shaft 41 has three circumferentially grooved portions 53, 54, 55 selectively engaged by catch 56 (Figs. 6 and 8) pressed towards the shaft by spring 57. Upon pressing the outer end of catch 56 upwardly, the shaft is released and can be moved axially. In this manner either of cams 44 or 45, or collar 46, can be moved opposite finger 61 (Fig. 7), adjustably secured to bracket 16. A helical spring 62 (Figs. 6, 7, 9) presses slide 31 and with it the cams against stop 61.

It will now be evident that, upon turning knob 52, one of the cams will move slide 31 relatively to bracket 16 with groove 17 while, at the same time, worm 43 moves lens mount 35 relatively to slide 31, at right angles to the cam movement. The lateral (worm) movement takes care of the parallax compensation, and the axial (cam) movement of the focus adjustment. By suitably dimensioning the cams with respect to the worm pitch, a given ratio between parallax compensation and focusing movement can be determined.

It was found that two finder lenses having suitably selected focal lengths are in general sufficient for cooperation with all camera objectives, the latter being grouped into short and long focus lenses for use with the two corresponding finder objectives. Accordingly, two cams are provided. It will be evident, however, that more than two view finder objectives could be used and an according number of cams provided.

Drum 51 is provided with scales, one for each finder lens or cam, respectively, which scales are calibrated to indicate object distances. They are set with the aid of an index on sleeve 59 (Figs. 3, 4, 8); the scale corresponding to cam 45 is visible when that cam contacts stop 61, whereas the scale corresponding to cam 44, previously hidden within sleeve 59, becomes visible when cam 44 is made operative by pulling shaft 41 forward. With the aid of these scales, the device can be set, for any one of a series of finder objectives, to a selected object distance for which the finder lens will then be correctly focused, and the parallax compensated.

Mattes corresponding to the finder objectives and cams, respectively, and to each camera lens of two groups of such lenses used with a respective finder objective, are provided and can be conveniently inserted in finder block 11, as shown in Fig. 3. It was found that, if the mattes are marked with appropriate legends, this way of changing mattes is actually more practical, flexible and less conducive to errors than previously proposed more or less automatic matte changing devices.

In order to provide for elimination of the focusing movement, if desired, a concentric collar 46 (Fig. 7) is provided, corresponding to groove 55 engaging latch 56 at the other end of the shaft. Fig. 8 shows collar 46 in contact with stop 61.

Referring to Fig. 2, the detailed arrangement of finder lens OF with its movements, of reflector R1 (prism P), matte M, screen S and viewing lenses VL1 and VL2, and of reflector R2 has so far been described.

As mentioned before, these elements are preferably mounted on the finder base as a single rigidly correlated unit, although it would not be especially disadvantageous to mount viewing elements VL1, VL2 and R2 separately as a unit CF (Fig. 2), or to insert screen S and matte M in the undeviated light path and mount reflector R1 either on base BF or in unit CF.

If the camera is used "wild," that is without blimp, the above mentioned viewing elements are preferably mounted on finder base 1. Mirror box 2 for reflector R2 (Figs. 3, 10, 11) is provided with hinges 71 supporting a viewing mirror box B (Figs. 3, 4, 10, 11, 12) supporting reflectors R3 and R4 in the manner indicated in Fig. 2. Preferably hinged at 72 to the top of box B is a viewing hood H. It will be observed that hinges 71 and 72 are so arranged that the reflectors are easily accessible and that, as indicated in Fig. 4, the operator can look with both eyes into hood H without being in any way inconvenienced or forced to assume positions liable to hamper him in his activities. A catch 73, 74 is provided for locking box B in operative position. Box B can be easily removed by lifting it from its hinges.

The eye lens VL3 is in this instance mounted in box B, between reflectors R3 and R4 (Figs. 10, 11, 12).

The view finder objective being very close to the camera lens would be at least partly covered by the lens hood (also called matte box) of the camera lens. Therefore, and in order to protect the view finder objective, I provide a hood for both lenses. In order not to diminish the effect of the conventional camera hood and yet to present the entire object field to the view finder, I provide a louvered partition between camera and finder objectives. As shown in Figs. 3 and 4, a hood 31, fastened to the camera, covers both lenses and has blades or strips 82 separating the lenses, which strips obstruct the field of vision of the view finder only slightly but effectively keep side light from the camera lens.

If the camera is used with a soundproof enclosure or blimp, I prefer to mount the viewing elements on the blimp wall next to the basic view finder unit on the camera, as shown in Figs. 13 and 14. In these figures, 101 is the blimp housing with side wall 102 into which is set a door 103. Door 103 has an insert 104 in which viewing lens VL3' is mounted (compare also Figs. 1 and 2) and which has on the outside grooves into which a blimp mirror box BB can be inserted. Mounted within this box are reflectors R3 and R4 in the manner indicated in Fig. 2, and a viewing hood BH excludes stray light.

It will be observed that lens VL3' serves at the same time as enlarging and as sound excluding element, an arrangement which reduces to a minimum the elements necessary for successful operation. Further, there is no mechanical sound directing the light beam carrying said image from said rear face around said housing to said aperture means.

8. Photographic apparatus of the character described comprising, in combination with a camera housing and a camera lens system mounted on said housing, a view finder base fixed to said housing, mounted on said base a view finder objective parallel to said camera lens system and a screen parallel to said lens system and said objective, means for reflecting an image bearing beam from said objective towards said screen, likewise mounted on said base a reflector for laterally deviating an image bearing light beam coming from said screen, and viewing means removably fastened to said housing for receiving said laterally deviated beam from said reflector.

9. Photographic apparatus of the character described comprising, in combination with a camera casing and a lens system mounted on said camera casing, a protective housing substantially enclosing said camera casing, a view finder base fixed to said camera casing, a view finder objective and a screen receiving an image from said objective mounted on said base within said protective housing, likewise mounted on said base a reflector for laterally deviating the image bearing light beam coming from said screen, and viewing means fastened to the outside of said protective housing for receiving said laterally deviated beam from said reflector.

10. Photographic apparatus of the character described comprising, in combination with a camera casing and a lens system mounted on said camera casing, a protective housing substantially enclosing said camera casing, a view finder base fixed to said camera casing, a view finder objective and a screen receiving an image from said objective mounted on said base within said protective housing, likewise mounted on said base a reflector for laterally deviating the image bearing light beam coming from said screen, a field lens mounted as window in a side wall of said protective housing for transmitting said lateral beam, and reflecting means mounted on the outside of said protective housing for viewing said beam.

11. Photographic apparatus of the character described comprising a camera housing, a camera objective mounted on said housing, a view finder base fastened to said housing, image receiving means on said base, a view finder objective, two slides supporting said view finder objective on said base, one slide movable in a direction substantially parallel to the axis of said camera objective, and the other in a direction substantially normal thereto, separate control means for the respective slides for moving them in said directions, respectively, and means for simultaneously actuating said control means.

12. View finder apparatus of the character described comprising in combination with a camera having a taking lens, a base fastened to said camera, mounted on said base substantially parallel to said lens a view finder objective, screen means substantially parallel to the axis of said objective and a reflector for directing an image bearing beam from said objective towards said screen means, and three reflectors fixed relatively to said base in the beam emerging from said screen means at angles diverting said beam into the direction of the axis of said objective, said four reflectors erecting said image.

13. A view finder of the character described comprising a base, slidingly mounted on said base a lens mount sleeve, supporting means slidingly mounted on said base for movement substantially parallel to the axis of said sleeve, supporting means slidingly mounted on said first supporting means for movement substantially normal to said axis, a lens mount fastened to one of said supporting means and engaging said sleeve, and means for adjusting said supporting means relatively to said base whereby said sleeve is moved by said lens mount normally to said axis and said mount slides in said sleeve along its axis.

14. A view finder unit comprising a base having a recess in the optical axis of the finder, mounted on said base in front of said recess a view finder objective, and a field lens unit including a frame and mounted thereon a field lens, screen surface means and a framing matte, said frame slidingly fitting said recess, for easy removal, in position to receive on said screen means an image produced by said objective.

WINTON C. HOCH.